United States Patent [19]

Smart

[11] Patent Number: 4,483,005

[45] Date of Patent: Nov. 13, 1984

[54] AFFECTING LASER BEAM PULSE WIDTH

[75] Inventor: Donald V. Smart, Cohasset, Mass.

[73] Assignee: Teradyne, Inc., Boston, Mass.

[21] Appl. No.: 305,274

[22] Filed: Sep. 24, 1981

[51] Int. Cl.$^3$ .............................................. H01S 3/10
[52] U.S. Cl. ...................................... 372/25; 372/27; 372/30; 372/12
[58] Field of Search ....................... 372/25, 26, 29, 30, 372/10, 12

[56] References Cited

U.S. PATENT DOCUMENTS

| | | | |
|---|---|---|---|
| 3,564,454 | 2/1971 | Hook et al. | 372/100 |
| 3,673,504 | 6/1972 | Hilberg | 372/10 |
| 3,713,032 | 1/1973 | Wentz | 372/12 |
| 3,737,231 | 6/1973 | Low et al. | 372/12 |
| 3,780,296 | 12/1973 | Waksberg et al. | 372/31 |
| 3,879,686 | 4/1975 | Milam et al. | 331/94.5 |
| 3,898,583 | 8/1975 | Shuey | 372/26 |
| 4,243,951 | 1/1981 | Wolkstein | 372/29 |

Primary Examiner—William L. Sikes
Assistant Examiner—Léon Scott, Jr.

[57] ABSTRACT

Reducing the widths of pulses in a beam from a laser by passing the beam through means to rotate the plane of polarization of the beam when a voltage is applied and reflecting the beam back through the means to rotate to a polarizer, the voltage being applied for a length of time equal to the desired pulse width, the portions of the pulses that have passed through the means to rotate when the voltage was applied being deflected by the polarizer into an output beam, the portions of the pulses that have passed through the means to rotate when the voltage was not applied being passed directly through the polarizer without being deflected into the output beam.

13 Claims, 13 Drawing Figures

AFFECTING LASER BEAM PULSE WIDTH

FIELD OF THE INVENTION

The invention relates to reducing the widths of pulses in a beam from a laser.

BACKGROUND OF THE INVENTION

Q-switched, continuously-pumped neodymium-YAG lasers typically have nominal pulse widths ranging from 50 to 400 nanoseconds, depending upon the type of laser and the rate of repetition of the pulses. It is often desirable to control the pulse width in order to control the energy carried by a single pulse. For example, when a laser is used to trim thin films on a semiconductor substrate, it is desirable to have short pulses to limit the substrate heating, which could cause undesired changes in physical and electrical characteristics of the substrate.

Laser pulse-width reducers of the type that pass a beam from a pulsed laser through a crystal that rotates the plane of polarization of the beam when a voltage is applied to the crystal have been used in the past. The beam pulse from the crystal, part of it having its initial polarization and part of it having the polarization rotated, is then passed through a polarizer which deflects the portion of the pulse with the rotated polarization into an output beam. With a lithium niobate crystal, 1,800 volts are necessary to rotate the plane of polarization 90° so that the rotated portion will be deflected by the polarizer. By using two crystals in series and having the beam pass through both of them, the voltage necessary to rotate the beam 90° can be reduced to 900 volts. Avalanche transistors or switching tubes operating at up to 4 or 5 kilovolts have been used in the past to drive the crystals. The avalanche transistor systems generally are not reliable and have short lives, and any fast, high-voltage switching causes significant radio frequency emissions, which must be shielded when trimming films on a semiconductor substrate. This is because otherwise the radio frequency emission will interfere with the circuitry receiving small signals from the workpiece to monitor the vaporization of portions of the thin film.

SUMMARY OF THE INVENTION

It has been discovered that by using a reflector to cause the laser beam to pass twice through the means to rotate the beam polarization, one could achieve the necessary rotation of polarization for laser pulse width reduction at voltages low enough to permit the use of solid state crystal drivers having reduced radio frequency generation, thereby reducing the amount of shielding necessary to avoid interference with the monitoring circuitry. In addition to having reduced radio frequency generation, such a system provides fast switching, which in turn permits very short pulse widths. In preferred embodiments the voltage is supplied by a field effect transistor; the means to rotate the polarization is an electro optical crystal (preferably lithium niobate), one transistor is connected to one side of the crystal, and another transistor is connected to the other side of the crystal, whereby initially both transistors are off resulting the zero voltage difference across the crystal, the first transistor is thereafter turned on to begin the laser output pulse, and then the second transistor is turned on to end the laser output pulse; means are provided to turn off the first transistor after a predetermined delay period following the beginning of the pulse from a laser; means are provided to turn off the second transistor after another predetermined time period following the turn off of the first transistor; and means are provided to activate the transistors during selected pulses from the laser but not during other pulses, to vary the repetition rate of the output beam.

DESCRIPTION OF THE PREFERRED EMBODIMENT

The structure and operation of the presently preferred embodiment of the invention will now be described after first briefly describing the drawings.

DRAWINGS

Figure 1:
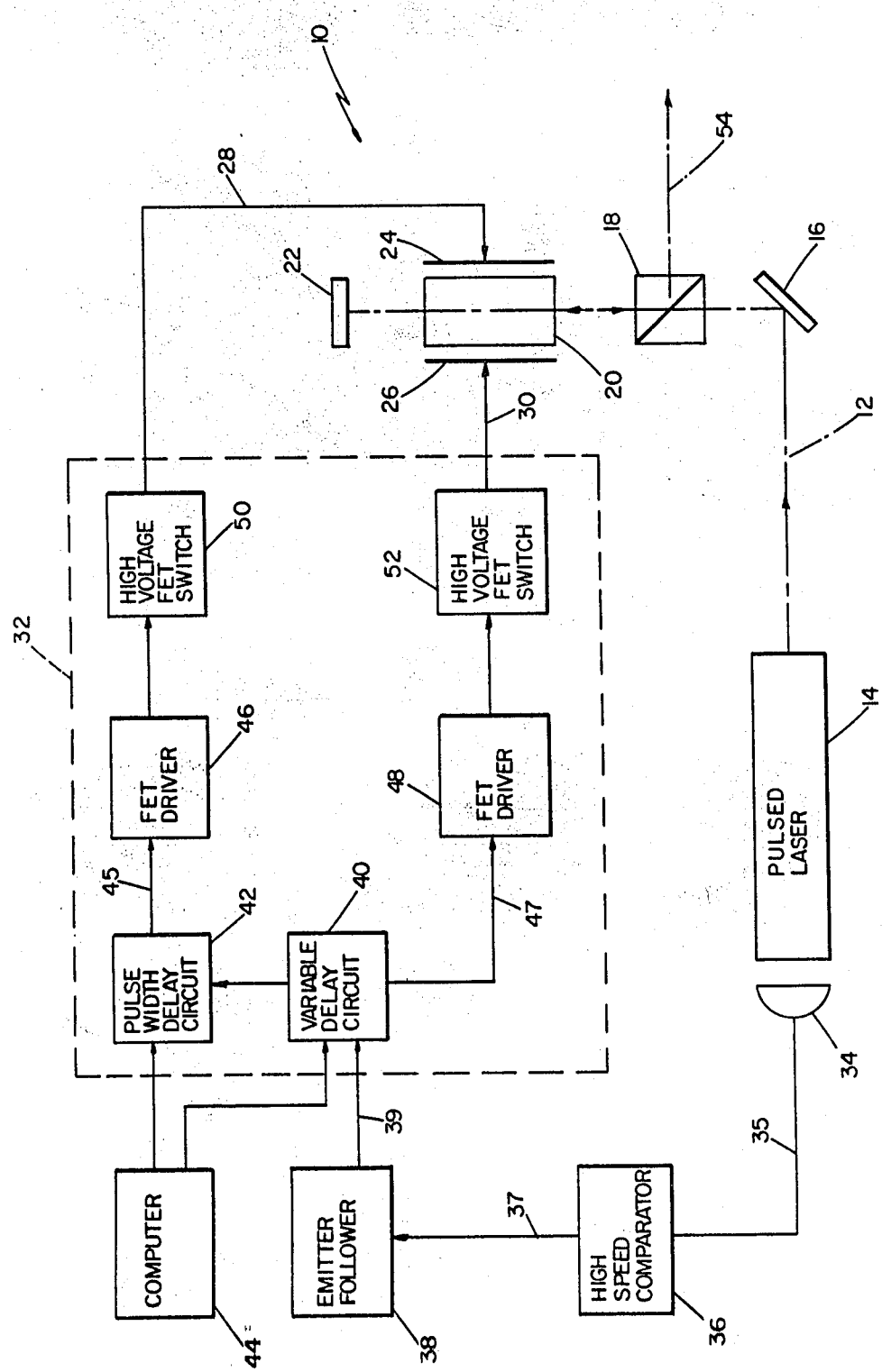
FIG. 1 is a diagram of apparatus for reducing the widths of pulses from a laser according to the invention.

FIGS. 7 A-E are five graphs of voltage (ordinate) versus time (abscissa) appearing at different locations within the FIG. 1 circuitry.

STRUCTURE

Figure 2:
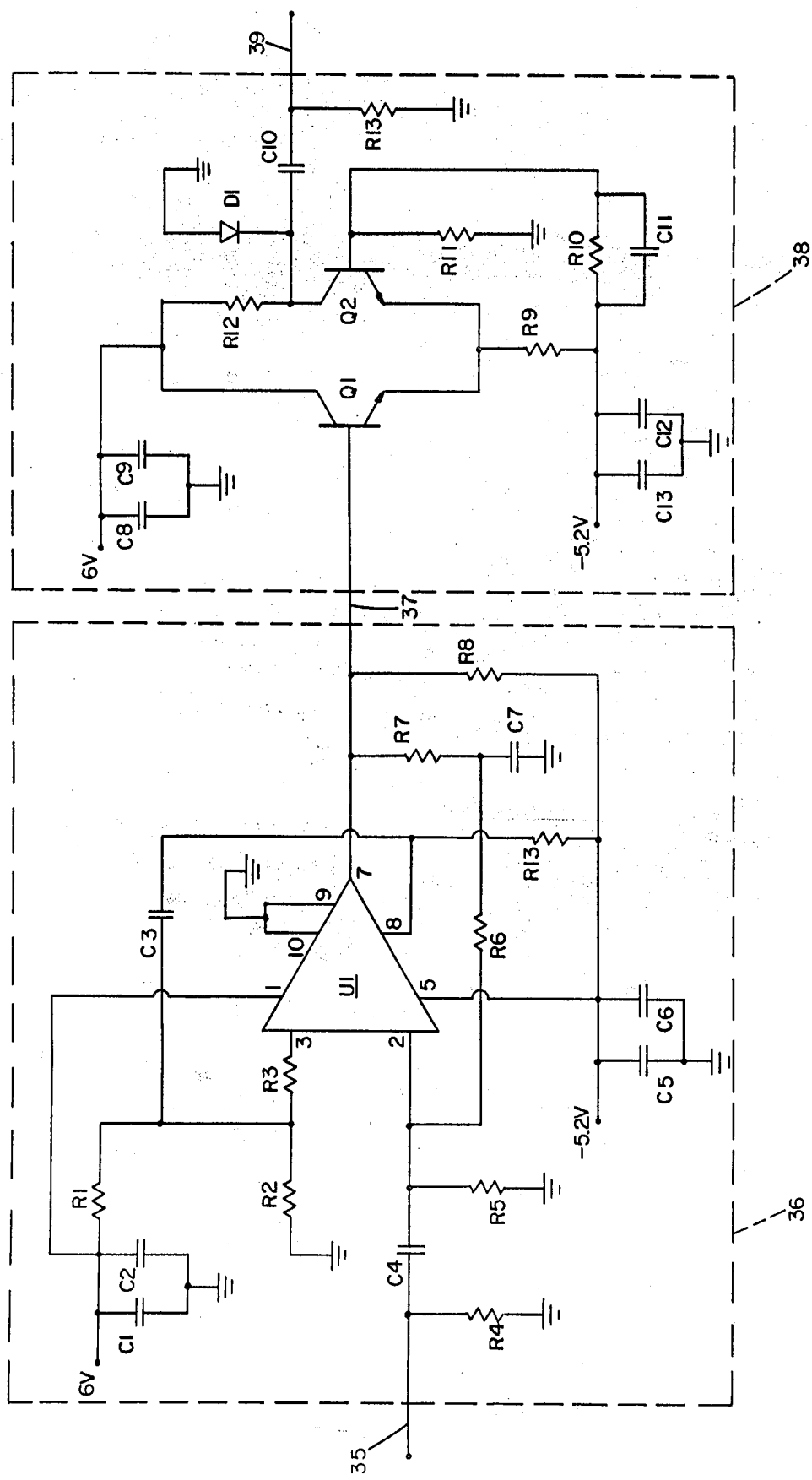
FIG. 2 is an electrical schematic of some elements of the FIG. 1 apparatus.
Figure 3:
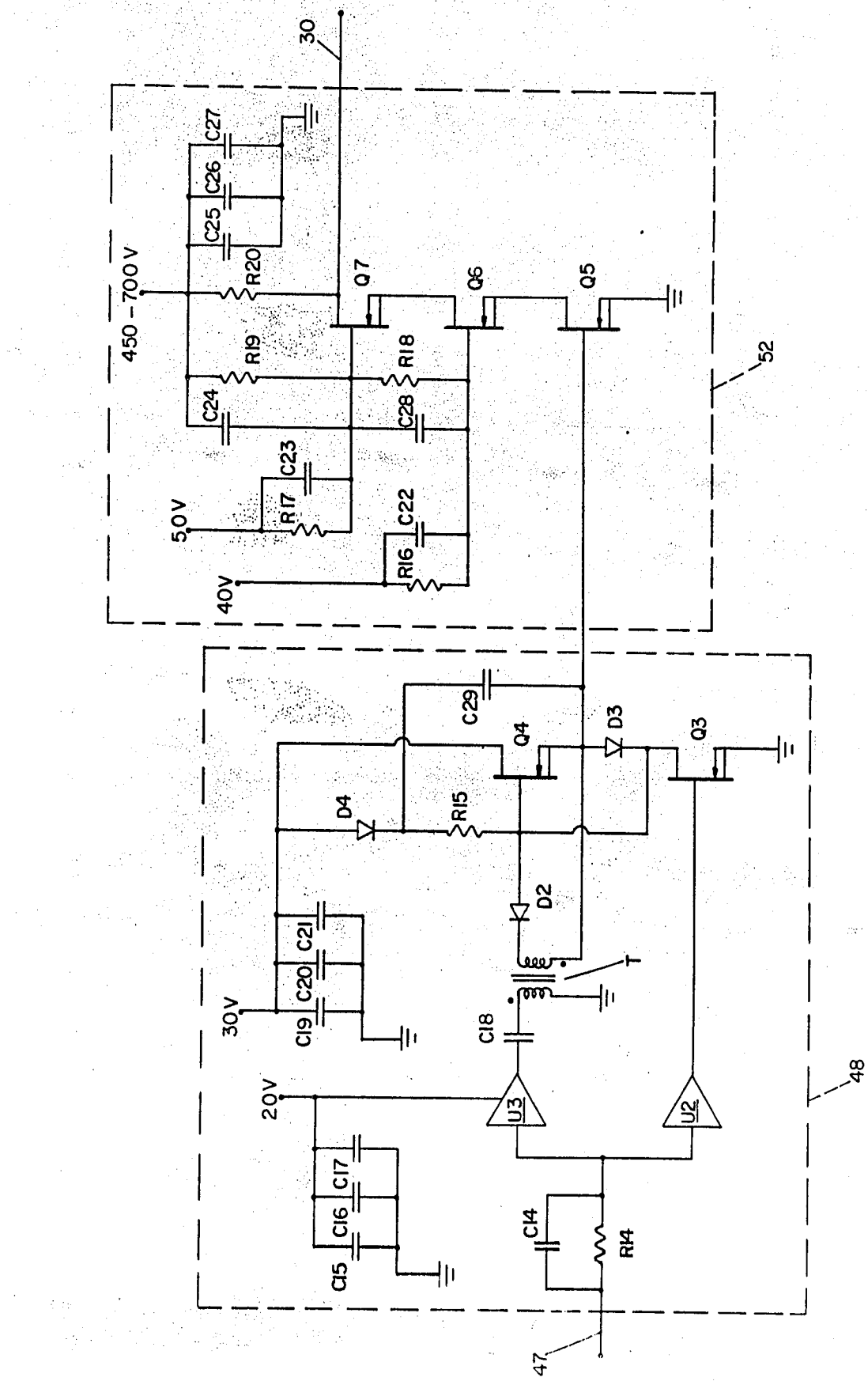
FIG. 3 is an electrical schematic of some other elements of the FIG. 1 apparatus.

Referring to FIGS. 1-3, there is shown apparatus 10 for reducing the widths of pulses in a beam 12 from Q-switched, continuously-pumped neodymium-YAG laser 14. One hundred percent reflector 16 is positioned to deflect beam 12 to polarizer 18 (a quartz block with a thin film oriented at a 45° angle to the travel of beam 12 within it), lithium niobate crystal 20, and 100% reflector 22. Electro optical crystal 20 comprises two 6 cm×6 cm×30 cm crystals positioned serially lengthwise along the axis for travel of beam 12. Brass electrodes 24, 26 are on opposite lengthwise sides of crystal 20 on top of gold coatings (not shown). Leads 28, 30 connect electrodes 24, 26 to optical crystal driver circuitry 32. Electro optical crystal 20 and its electrodes have a 20 picofarad capacitance.

Photodiode monitor 34 is positioned on the opposite side of laser 14 from its output beam 12 to sense the leakage from the rear reflector of the laser. It provides a signal (peaking at approximately 1 volt) on line 35 to high speed comparator 36 (FIGS. 1 and 2), which senses the initial buildup of the signal from photodiode 34. Emitter follower 38 (FIGS. 1 and 2) is connected between high speed comparator 36 and optical driver circuitry 32 to translate the comparator output to a 5 volt TTL signal on line 39. Variable delay circuit 40 and pulse width delay circuit 42 are controlled by computer 44 and provide delayed signals on lines 45, 47 to field effect transistor (FET) drivers 46, 48, which are high speed, high current, low impedance drivers that convert the 5 volt input signal to a 30 volt output signal to drive the high voltage FET switches 50, 52, respectively. Computer 44, pulse width delay circuit 42 and variable delay circuit 40 are provided by a Teradyne M365 computer; alternatively, AM 685 components (available from Advanced Micro Circuits, Sunnyvale, Calif.) connected in the Schmidt trigger configuration can be used for circuits 40, 42.

Referring specifically to FIG. 3, the components for FET driver 48 and high voltage FET switch 52 are shown in detail. (FET driver 46 and high voltage FET switch 50 are identical to driver 48 and switch 52.) Current drivers U2, U3 are connected to drive FET's Q3, Q4 respectively. Transformer T (1:1 ratio; 3 turns #30 bifilar wire on a ferrite bead) is connected between U3 and Q4 to supply a signal to the gate of Q4 inverted from that supplied to the gate of Q3. Capacitor C29 is connected to the 30 volt supply rail through diode D4 and to transistor Q4 to maintain the gate-source voltage of transistor Q4. High voltage FET's Q5, Q6, and Q7 are connected in series. The gate of FET Q5 is connected to FET's Q3, Q4, and the output of FET Q7 is connected through line 28 to crystal 20. The 40 and 50 volt supply rails are connected to drive the gates of FET's Q6, Q7, and the 450–700 volt supply rail is connected to the output of FET Q7.

The components shown in the FIGS. 2 and 3 schematics are as follows:

Components

R1—4.7 kilohms
R2—10 ohms
R3, R5, R8, R13—900 ohms
R4—50 ohms
R6—400 ohms
R7, R15—10 kilohms
R9—33 ohms
R10—470 ohms
R11—150 ohms
R12—56 ohms
R14—1 kilohms
R16, R17—820 kilohms
R18, R19—1 megohms C1, C5, C8, C10, C11, C13, C16, C20, C26—0.1 microfarad
C2, C6, C9, C12—15 microfarad
C3—2 picofarad
C4—271 picofarad
C7—51 picofarad
C14—100 picofarad
C15, C19, C25—3 microfarad
C17, C21, C27—0.001 microfarad
C18—2200 picofarad
C22, C23—47 picofarad
C24, C28—39 picofarad
C29—2000 picofarad

D1, D2, D3, D4—FD 777
Q1, Q2—2N 3646
Q3, Q4—VN01
Q5, Q6, Q7—VN 6000 KNT

U1—AM 685
U2, U3—DS 0026

OPERATION

Figure 4A:
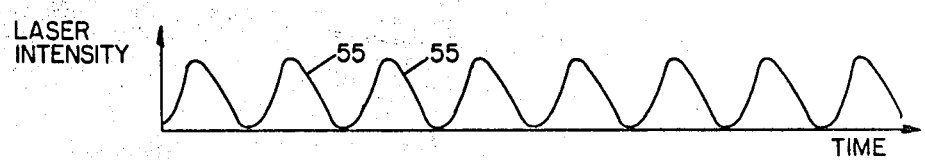
FIG. 4A is a graph of laser intensity (ordinate) versus time (abscissa) of a pulsed beam from a laser source.
Figure 4B:
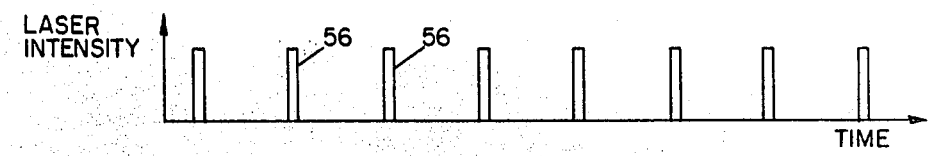
FIGS. 4B and 4C are graphs of laser intensity (ordinate) versus time (abscissa) for reduced-width pulses in an output beam according to the invention.
Figure 4C:
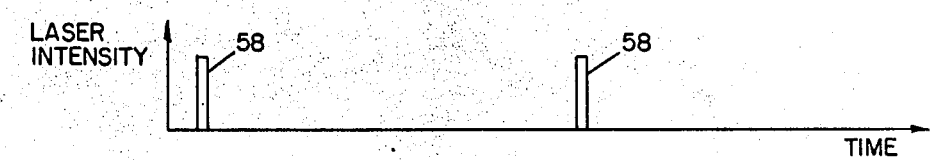
Figure 5:
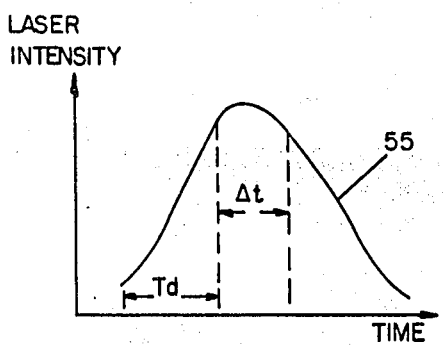
FIG. 5 is a graph of laser intensity (ordinate) versus time (abscissa) for a pulse from a laser source.
Figure 6:
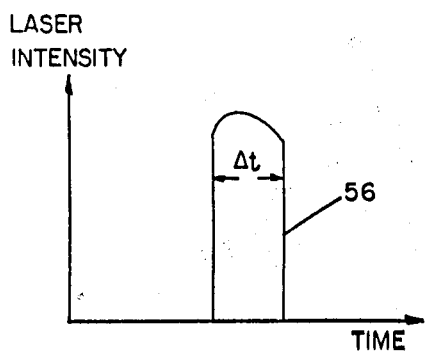
FIG. 6 is a graph of laser intensity (ordinate) versus time (abscissa) for the portion of the FIG. 5 pulse that is in the output beam of the FIG. 1 apparatus.

In operation laser 14 provides 200 nanosecond width pulses 55 at a repetition rate of up of 10 kHz. (This is shown in FIG. 4A; pulses 55 are in reality spaced from each other in time.) Laser beam 12, which is polarized, is reflected by 100% reflector 16 so that it passes through polarizer 18 and lithium niobate crystal 20. After passing through crystal 20, beam 12 is reflected by 100% reflector 22, back through crystal 20 and then into polarizer 18. When no voltage appears across crystal 20, the pulses in beam 12 returning to polarizer 18 have the original polarization and pass straight through polarizer 18. When a voltage is applied to crystal 20, during the period that a portion of a pulse is passing through it, the plane of polarization will be rotated 90° (it is rotated by 45° on each passage through crystal 20), and the portion is deflected 90° at polarizer 18 to comprise output beam 54. Referring to FIG. 5, the nominal wave shape of pulse 55 of beam 12 is shown with dashed lines identifying the desired pulse width, $\Delta t$. The delay time, $T_d$, for beginning the desired output pulse after the beginning of pulse 55 of beam 12 is also shown. The shape of the pulse in output 54 is shown in FIG. 6. As is seen from FIGS. 4B and 4C, crystal 20 can be activated to provide an output beam 45 with narrow (e.g., as short as ten nanoseconds) pulses 56, having the same repetition rate as the pulses in beam 12, or the repetition rate can be decreased by activating crystal 20 during selected pulses (e.g., 1 out of every 4 pulses) to obtain less-frequent narrow pulses 58.

Referring to FIGS. 1, 2, 3, and 7, the driving of lithium niobate crystal 20 will now be described. Initially, 450 volts is applied to both electrodes 24, 26 resulting in zero voltage across crystal 20 and no rotation of the plane of polarization. Photodiode monitor 34 detects the leakage from the rear reflector of pulsed laser 14 and provides a signal (FIG. 7A) that has the same nominal wave shape as pulse 55 in laser beam 12 and peaks at approximately 1 volt. High-speed comparator 36 senses the initial buildup of a signal from photodiode 34 and produces a trigger signal. When the photodiode output reaches 10 millivolt, the signal from comparator 36 on line 37 then changes from −0.960 volt to −1.85 volts, and this is translated by emitter follower 38 to a 0 to 5 volt TTL signal shown in FIG. 7B approximately 150 nanoseconds long with 10 nanosecond rise and fall times. Variable delay circuit 40 provides output signals similar to that shown in FIG. 7B; however, they are provided to FET driver 48 and pulse width delay circuit 42 at a time $T_d$ after the beginning of laser pulse 55. Pulse width delay circuit 42 provides a signal which is similar to that shown in FIG. 7B to FET driver 46 and is delayed from the beginning of the pulse by an additional time period equal to the desired pulse width, $\Delta t$. Computer 44 controls variable delay circuit 40 and pulse width delay circuit 42.

Figure 7A:
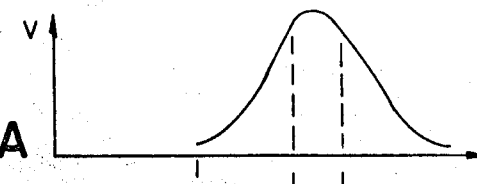
Figure 7B:
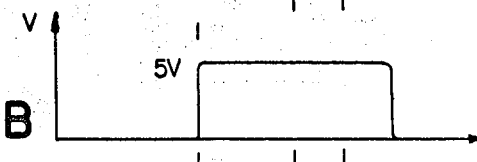
Figure 7C:
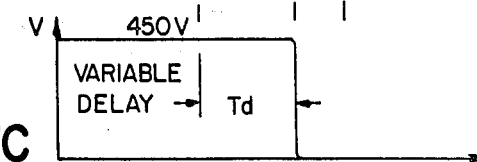
Figure 7D:
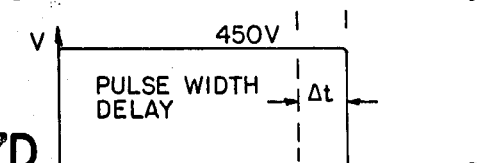
Figure 7E:
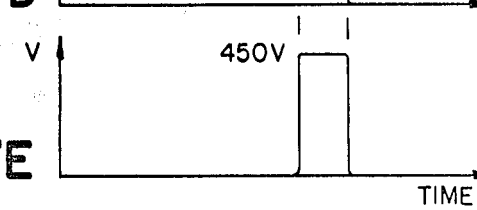

When driver 48 receives a TTL signal from variable delay circuit 40, driver U2 drives FET Q3 on, and driver U3 and transformer T drive FET Q4 off. When FET Q3 is turned on, a 30−volt, high current signal is provided to FET Q5 in high voltage switch 52, making FET Q5's gate-source voltage positive and turning it on, in turn making the gate-source voltages of FET's Q6 and Q7 positive, thereby causing the voltage on electrode 26 to drop from 450 volts to zero within a 5 nanosecond period, as is shown in FIG. 7C. The voltage at electrode 24 is similarly decreased at a time $\Delta t$ later, as is shown in FIG. 7D. The effective voltage seen by crystal 20 is presented in FIG. 7E. Thus, the voltage difference across the crystal goes from zero up to 450 volts, at a time $T_d$ after the beginning of pulse 50, and returns to zero, at a time $\Delta t$ later.

Referring to FIG. 3, while FET Q3 is on, capacitor C29 is charged by the 30 volt supply rail through diode D1. When FET Q3 is turned off (at the end of the TTL signal), the gate voltage on FET Q4 goes to the 30 volts of the supply rail. As the source of FET Q4 begins to rise, the voltage across capacitor C29 is maintained, thereby maintaining the gate-source voltage of FET Q4 and turning off FET's Q5, Q6, and Q7.

Because beam 12 is passed through crystal 20 twice, the required 90° rotation of the polarization is achieved by only 450 volts, which is quickly and reliably provided by solid state circuitry 32. The radio frequency problems associated with switching tube optical drivers are not present, and the shielding necessary to avoid disturbance of the monitoring circuitry connected to monolithic subcircuits (not shown) being trimmed by output beam 54 is reduced. With the system described, output pulse widths as short as 10 nanoseconds can be achieved, and by shortening the fall time for the 450 volt driving signals in FIGS. 7C and 7D, the pulse widths can be reduced even more. The use of two drivers and FET switches permits the short pulse widths to provide for easy variation of the pulse widths by adjusting Δt.

OTHER EMBODIMENTS

Other embodiments of the invention are within the following claims. For example, a single FET driver and FET switch could be used to drive crystal 20; in that case the pulse width is equal to the length of the trigger signal. Also, crystals can be fabricated from potassium dihydrogen phosphate, deuterated potassium dihydrogen phosphate, or lithium tantalate.

What is claimed is:

1. Apparatus comprising
 a pulsed laser providing a beam having an initial plane of polarization of radiation, said beam being in pulses having a laser output pulse width in time,
 means to rotate the plane of polarization of radiation in said beam passing through it when a voltage is applied,
 said means to rotate being positioned to have said beam from said laser pass through it,
 a reflector to reflect said beam passing through said means to rotate back through said means to rotate,
 a polarizer means for having said reflected beam from said means to rotate pass through it,
 and for passing without deflection radiation with an initial plane of polarization and for deflecting into an output beam radiation with a rotated plane of polarization rotated from said initial plane of polarization, and
 means to selectively apply a voltage to said means to rotate for a length of time shorter than said laser output pulse width to selectively provide timed-reduced output pulses, said length of time being equal to a time-reduced output pulse width,
 said time-reduced laser output pulses being repeated at a repetition rate, said means to selectively apply a voltage comprising; a first high voltage field effect transistor switch means, a field effect transistor driver, and a selectively variable pulse with timing means; said means to rotate, said reflector, said polarizer and said means to selectively apply a voltage are all located external to said pulsed, laser.

2. The apparatus of claim 1 wherein said means to rotate is an electro optical crystal, said means to apply a voltage includes a second field effect transistor, said first transistor is electrically connected to one side of said crystal, and said second transistor is electrically connected to the other side of said crystal, whereby deactivating both said transistors results in zero voltage across said crystal, activating said first transistor provides said voltage to rotate said polarization and begin said laser output pulses, and activating said second transistor removes said voltage and ends the laser output pulses.

3. The apparatus of claim 2 further comprising means to activate said first transistor after a delay period following the beginning of a pulse from said laser.

4. The apparatus of claim 3 further comprising means to activate said second transistor at a time following the activation of said first transistor by an amount equal to said time-reduced pulse width.

5. The apparatus of claim 4 including means to activate said transistors during selected pulses from said laser to vary the repetition rate of the output beam.

6. The apparatus of claim 2 wherein said crystal is lithium niobate.

7. A method of reducing the width in time of laser output pulses in a beam from a pulsed laser, said beam having an initial plane of polarization of radiation, to provide time-reduced output pulses having a time-reduced output pulse width, said method comprising
 passing said beam from said pulsed laser through means to rotate the plane of polarization of radiation passing through it when a voltage is applied,
 reflecting said beam passing through said means to rotate back through said means to rotate and to a polarizer,
 said polarizer being positioned to pass without deflection radiation at an initial plane of polarization and to deflect into an output beam radiation with a rotated plane of polarization rotated from said initial plane of polarization, and
 applying a voltage to said means to rotate for a length of time shorter than said width in time of laser output pulses, said length of time being equal to said time-reduced output pulse width,
 said time-reduced output pulses being repeated at a repetition rate,
 whereby said time-reduced width of said time reduced output pulse in said output beam can be selectively reduced by selecting the length of time said voltage is applied.

8. The method of claim 7 wherein said voltage is applied by a first field effect transistor.

9. The method of claim 8 wherein said means to rotate is a lithium niobate crystal, said voltage is applied to sayd crystal by said first transistor and a second field effect transistor, said first transistor is electrically connected to one side of said crystal, said second transistor is electrically connected to the other side, whereby deactivating both said transistors results in zero voltage across said crystal, activating said first transistor provides said voltage to rotate said plane of polarization and begins the laser output pulse, and activating said second transistor takes away the voltage and ends the laser output pulse.

10. The method of claim 9 wherein said first transistor is activated after a delay period following the beginning of a pulse from said laser.

11. The method of claim 10 further comprising activating said second transistor at a time following the activation of said first transistor by an amount equal to said time-reduced pulse width.

12. The method of claim 11 including activating said transistors during selected pulses from said laser to vary the repetition rate of the output beam.

13. The method of claim 9 wherein said crystal is lithium niobate.

* * * * *